(12) United States Patent
Channa

(10) Patent No.: US 9,986,110 B2
(45) Date of Patent: May 29, 2018

(54) SYSTEM AND METHOD FOR PROXIMITY BASED GENERATION OF CUSTOM USER INTERFACES

(71) Applicants: Kabushiki Kaisha Toshiba, Minato-ku (JP); Toshiba TEC Kabushiki Kaisha, Shinigawa-ku (JP)

(72) Inventor: Jonathan A. Channa, Rancho Cucamonga, CA (US)

(73) Assignees: Kabushiki Kaisha Toshiba, Minato-ku (JP); Toshiba TEC Kabushiki Kaisha, Shinagawa-ku (JP)

(*) Notice: Subject to any disclaimer, the term of this patent is extended or adjusted under 35 U.S.C. 154(b) by 0 days. days.

(21) Appl. No.: 15/192,000

(22) Filed: Jun. 24, 2016

(65) Prior Publication Data

US 2017/0374210 A1    Dec. 28, 2017

(51) Int. Cl.
| | |
|---|---|
| *G06F 3/12* | (2006.01) |
| *H04N 1/00* | (2006.01) |
| *H04W 4/00* | (2018.01) |
| *H04M 11/00* | (2006.01) |
| *H04L 29/08* | (2006.01) |
| *H04L 12/24* | (2006.01) |
| *H04N 1/44* | (2006.01) |

(52) U.S. Cl.
CPC ......... *H04N 1/00411* (2013.01); *H04L 41/22* (2013.01); *H04L 67/306* (2013.01); *H04M 11/007* (2013.01); *H04N 1/0044* (2013.01); *H04N 1/00244* (2013.01); *H04N 1/4413* (2013.01); *H04W 4/008* (2013.01); *H04N 2201/006* (2013.01); *H04N 2201/0094* (2013.01)

(58) Field of Classification Search
CPC .......... H04N 1/00411; H04N 1/00244; H04N 1/0044; H04N 1/4413; H04N 2201/006; H04N 2201/0094; H04L 41/22; H04L 67/306; H04M 11/007; H04W 4/008
USPC ........................................................ 358/1.15
See application file for complete search history.

(56) References Cited

U.S. PATENT DOCUMENTS

| | | | | |
|---|---|---|---|---|
| 7,911,626 | B2* | 3/2011 | Ferlitsch | H04N 1/00352 345/172 |
| 2005/0122540 | A1* | 6/2005 | Kadowaki | G06Q 30/02 358/1.15 |
| 2011/0222107 | A1* | 9/2011 | Williams | G06F 3/1205 358/1.15 |
| 2013/0188215 | A1* | 7/2013 | Kato | H04N 1/00482 358/1.14 |

(Continued)

*Primary Examiner* — Neil R McLean
(74) *Attorney, Agent, or Firm* — Ulmer & Berne LLP

(57) ABSTRACT

A system and method for document processing includes a controller configured for digital control of multifunction peripheral operations. The controller detects a portable data device and receives configuration data through a near field communication interface. The controller selectively enables of document processing operations of the MFP as specified by received configuration data. The controller generates an active display on a touch screen control panel in accordance with the received configuration data and receives user selection data via the active display on the touch screen control panel. The controller commences a document processing operation in accordance with received user selection data.

19 Claims, 6 Drawing Sheets

(56) References Cited

U.S. PATENT DOCUMENTS

2014/0240777 A1* 8/2014 Itogawa ................ G06F 3/1292
358/1.15

* cited by examiner

SYSTEM AND METHOD FOR PROXIMITY BASED GENERATION OF CUSTOM USER INTERFACES

TECHNICAL FIELD

This application relates generally to personalized user interfaces for document processing devices. The application relates more specifically to automatically generating personalized user interfaces for users who approach a multifunction peripheral by use of short range wireless communication options, such as near field communication.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Given the expense in obtaining and maintain MFPs, devices are frequently shared or monitored by users or technicians via a data network. MFPs, while moveable, are generally maintained in a fixed location. Until more recent times, users, which may include individuals or groups such as employees, technicians or administrators of networked MFPs, were also generally in relatively fixed locations. A user would typically communicate documents or other information from his or her office or workstation to a designated MFP. An administrator or technician would also monitor MFPs from a workstation.

Users may send document processing jobs, such as a print request, to one or more networked devices. In a typical shared device setting, one or more workstations are connected via a network. When a user wants to print a document, an electronic copy of that document is sent to a document processing device via the network. The user may select a particular device when several are available. The user then walks to the selected device and picks up their job or waits for the printed document to be output. If multiple users send their requests to the same device, the jobs are queued and outputted sequentially.

User devices have become increasingly mobile. Often times users interact with MFPs via portable notebook computers, or via handheld devices such as tablet computers, smartphones, or the like. While many portable devices may still be used at a workplace, a user may do so from various workplace locations. A user may select a particular MFP for processing their job in certain situations. In others, a user's job may be routed to an MFP assigned to that user, one that is the closest to the user's location or workstation, one with capabilities needed for the user's job or one that is fully functional for desired document processing.

Often times workplaces have multiple MFPs which may comprise different models or may even come from different manufacturers.

SUMMARY

In accordance with an example embodiment of the subject application, a system and method for document processing includes a controller configured for digital control of multifunction peripheral operations. The controller detects a portable data device and receives configuration data through a near field communication interface. The controller selectively enables of document processing operations of the MFP as specified by received configuration data. The controller generates an active display on a touch screen control panel in accordance with the received configuration data and receives user selection data via an active, touchscreen display. The controller commences a document processing operation in accordance with received user selection data.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

When users of MFP devices approach a particular device for their document processing job, in certain instances the job may have already been completed from a remote request previously given by the user. For example, a user may have sent or directed a document for printing, and it would be waiting for them in a print output bin upon their arrival. In other instances, a job may be commenced by the user at the MFP device. In other instances, a job request may have sent by the user to the MFP, but additional selections at the MFP device are required. In still another instance, a user may wish to defer printing until their arrival at a device, such as when printing documents with sensitive information.

MFPs are continuingly becoming more sophisticated with ever increasing functionality. With such evolution, an MFP user interface can possess a myriad of function options. Modern day MFPs seek to simplify operation by generating intuitive graphical and text images on a display, such as an associated touch screen. Even with a well-designed user interface, device operation via the touchscreen can be confusing. This is particularly so when a user is confronted with different interfaces from different MFP models or different MFP manufacturers.

In reality, notwithstanding a large array of document processing options available on MFPs, users will often use only a small portion of available functions or a subset of functions particular to a user's typical needs. As described in detail below, the subject system and method provides for display of a user's personalized user interface. The subject system further provides for seamlessly integrating each user's personalized interface to an MFP user interface when the user approaches a device for use.

Figure 1:
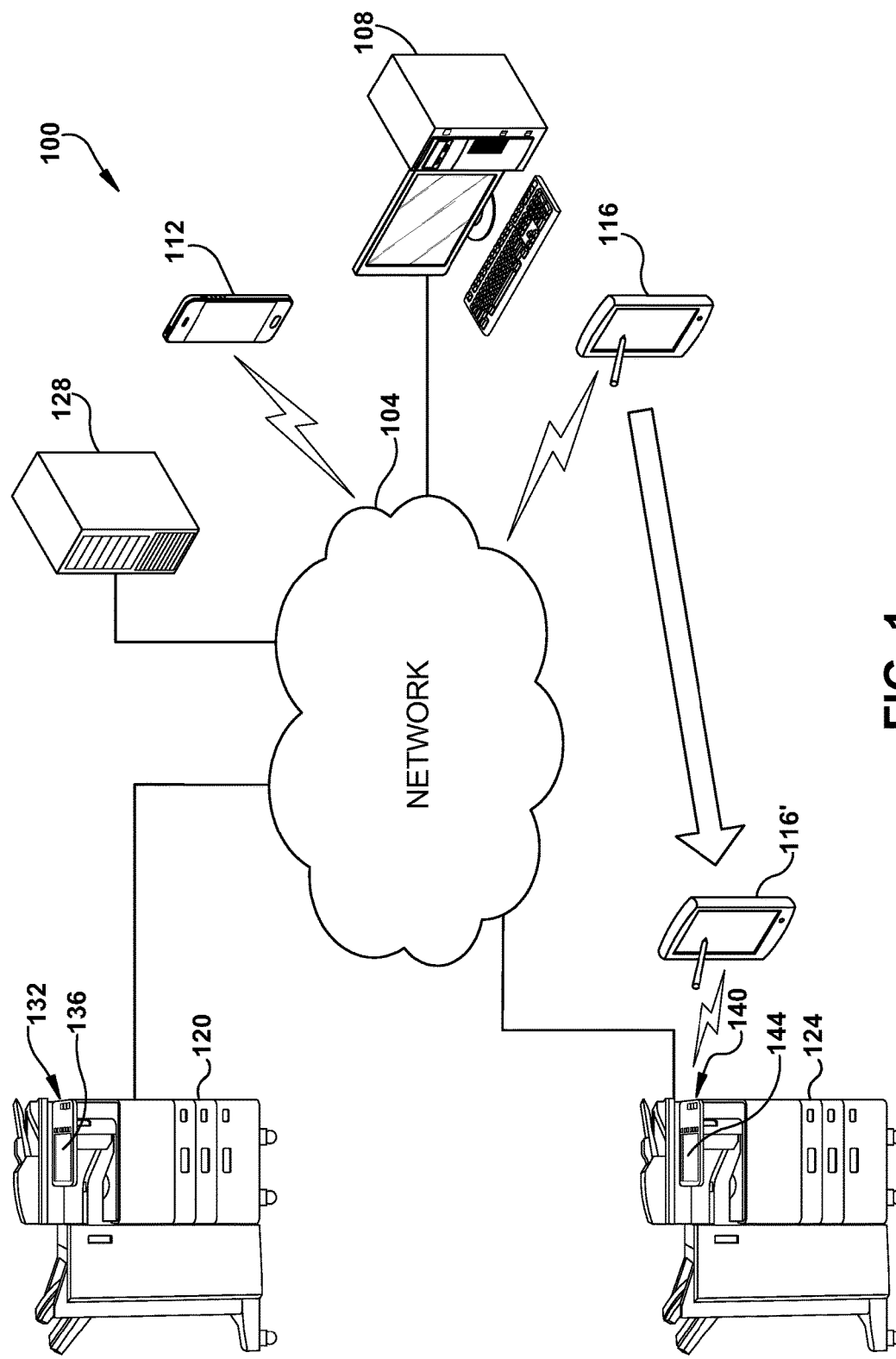
FIG. 1 an example embodiment of a document processing environment.

In accordance with the subject application, FIG. 1 illustrates an example embodiment of a document processing environment 100. Network 104 is any suitable wired, wireless or hybrid data communication system. Network 104 is suitably comprised of one or more local area networks, one or more wide area networks such as the Internet, or any suitable combination thereof. Example user devices that are in data communication with network 104 include workstation 108, smartphone 112 and tablet computer 116. It is to be appreciated that any suitable digital data device is suitably connected via network 104. In the example embodiment of FIG. 1, workstation 108 is in a wired data path to network 104 while smartphone 112 may be in communication via a cellular link and tablet 116 in communication wirelessly, such as via WiFi, Bluetooth, near field communication, or the like. Networked data devices suitably communicate electronic documents for processing, such as via MFP 120 or MFP 124. Devices may also relay one or more electronic documents from networked storage such as fileserver 128.

MFP 120 includes a user interface 132 that includes a user input and display output comprised of a touchscreen 136 in the example embodiment. It will be appreciated that any suitable man-machine interface is suitably implemented as will be understood by one of ordinary skill in the art. Similarly, MFP 124 includes user interface 140 including touchscreen 144.

Modern MFPs include intelligent controllers including one or more processors and associated memory or data storage, such as random access memory, read only memory, hard discs, optical storage, or any other suitable data storage mechanism. Controllers interface with sensors, motor controls, toner controls, rollers, drums, and other device components. Controllers are also used to generate a user interface on an associated MFP display. As noted above, controllers are typically programmed to provide for user device control, and may include a standard user interface. In the example of FIG. 1, a standard or other default user interface is suitably customized for one or more users, and data defining this custom interface may be associated with a data device, such as portable data devices including smartphone 112 or tablet 116.

In the example embodiment of FIG. 1, portable data devices are associated with an associated user's personalized or assigned user interface. The user's interface configuration is defined or encoded in any suitable data format, such as in extensible markup language (XML) which may be understood by both humans and digital devices. Each configuration file suitably includes identification data which functions to identify a particularly user relative to their own configuration data. MFPs 120, 124 are proximity sensitive relative to portable data devices, such as smartphone 112 or tablet 116 such that a data communication path between them is established when the devices are close together. A data path is suitably established between the devices via a wireless link, such as with optical or radio frequency (RF) linking. Optical may include infrared links, laser links or the like. RF linking may include near field communication (NFC) links, WiFi links, BLUETOOTH links, or the like, as with a wired data connection, including tethering a user device directly to an MFP 120, 124. Direct data link alternatives between an MFP 120, 124 and a user device, such as NFC, BLUETOOTH or tethering, may be advantageous insofar as relative proximity between the devices is more readily established which may be desirable when more than one user is directing document processing operations to the same MFP 120, 124. By way of example, while metadata associated with a user, such as a location of a WiFi access point currently in use, may assist in determining proximity, as would geo-location data, there is a greater opportunity for error relative to which user is more proximate to the MFP 120, 124 without the addition of hardware or software adjuncts to further refine proximity, such as IP address, router hops, global positioning data, triangulation, or the like.

In one example embodiment, proximity may be sensed by a NFC link between the user device and an MFP 120, 124. In the example embodiment of FIG. 1, tablet 116 is moved to a location 116', physically proximate to MFP 124. In the example, the user suitably touches their device to an area, such as touchscreen 144 where from NFC is established between the devices. Further details of communication between user devices and MFPs 120, 124 will be described below.

Figure 2:
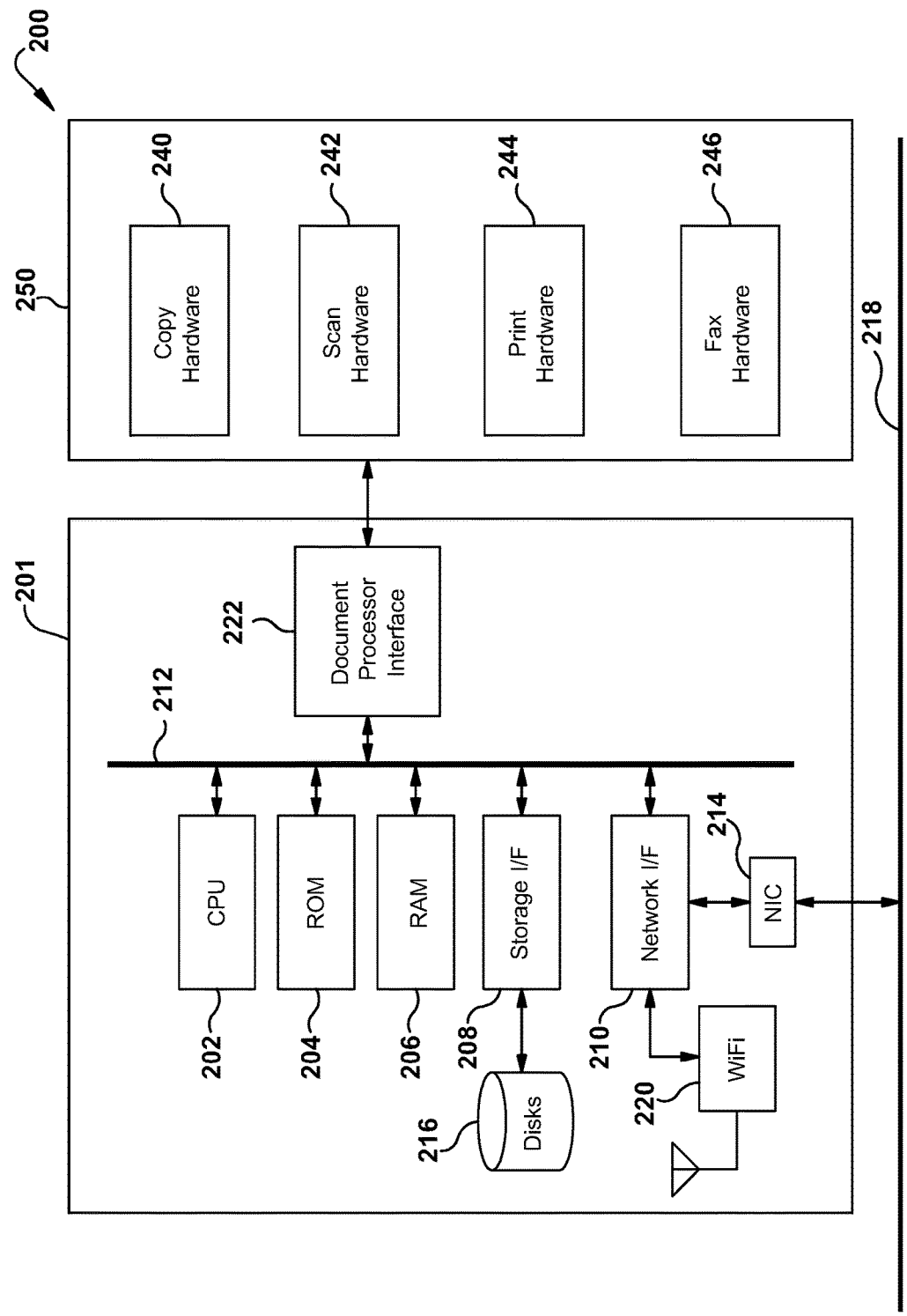
FIG. 2 is an example embodiment of a document rendering system.

Turning now to FIG. 2, illustrated is an example of a document rendering system 200 suitably comprised within an MFP, such as with MFPs 120 and 124 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 218, or to a wireless data connection via wireless network interface 220. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. NIC 214 and wireless network interface 218 suitably provide for connection to an associated network (not shown).

Processor 202 can also be in data communication with any suitable user input/output (I/O) interface which provides data communication with user peripherals, such as displays, keyboards, mice, track balls, touch screens, or the like. Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional units 250. It will be understood that functional units are suitably comprised of intelligent units, including any suitable hardware or software platform.

Figure 3:
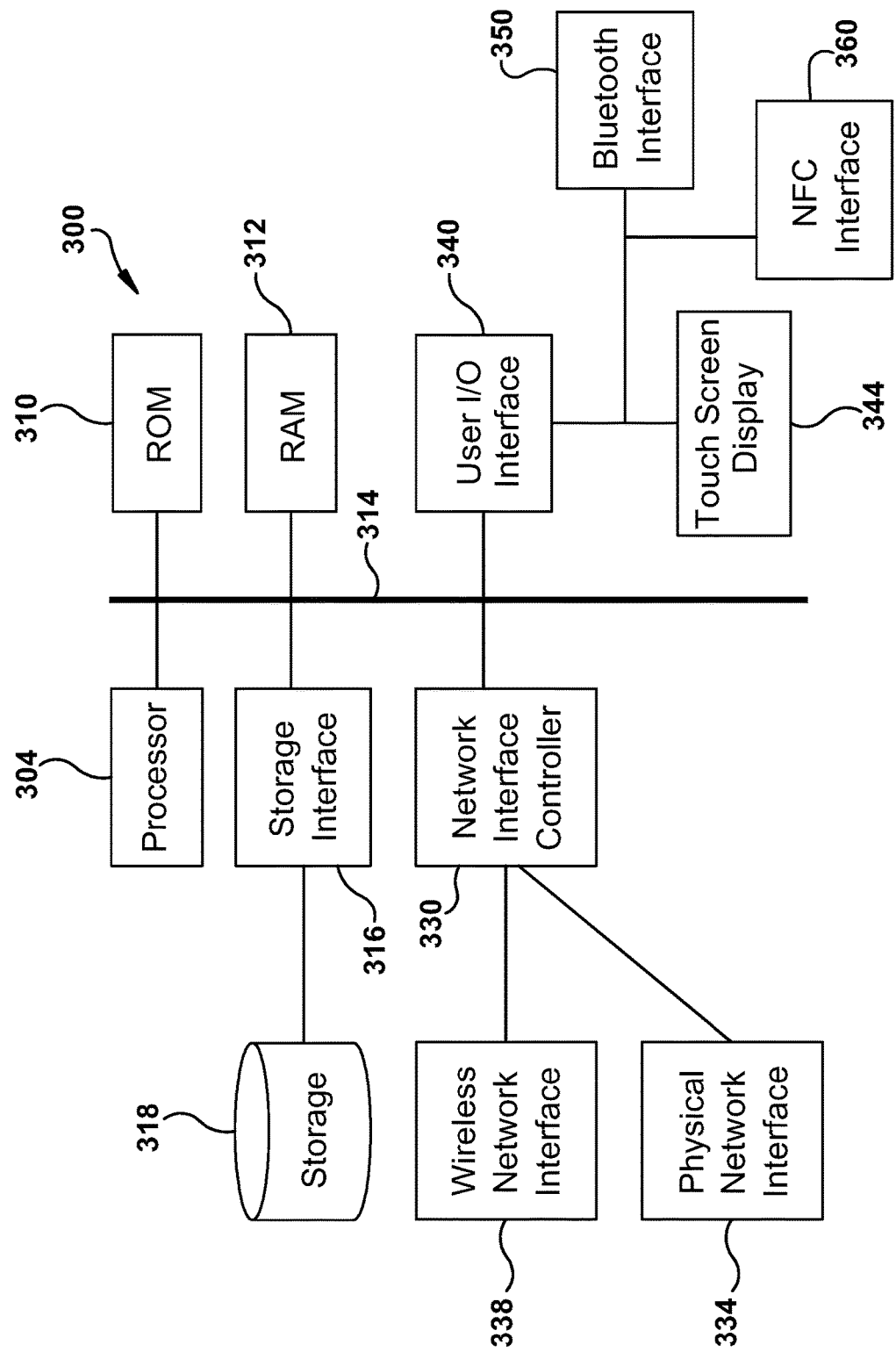
FIG. 3 is an example embodiment of a digital device system.

Turning now to FIG. 3, illustrated is an example embodiment of a digital device system 300 suitably comprising personal or portable data devices, such as user devices 108, 112 or 116, as well as associated network storage such as fileserver 128. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 316 for reading or writing to a data storage system 318, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338. Example wireless connections include cellular, Wi-Fi, Bluetooth, NFC, wireless universal serial bus (wireless USB), satellite, and the like. Example wired interfaces include Ethernet, USB, IEEE 1394 (FireWire), telephone line, or the like.

Processor 304 is also in data communication with a user input/output (I/O) interface 340 which provides data communication with user peripherals, such as touch screen display 344, Bluetooth interface 350, or near-field communication interface 360, as well as keyboards, mice, track balls, touch screens, or the like. It will be understood that functional units are suitably comprised of intelligent units, including any suitable hardware or software platform.

Figure 4:
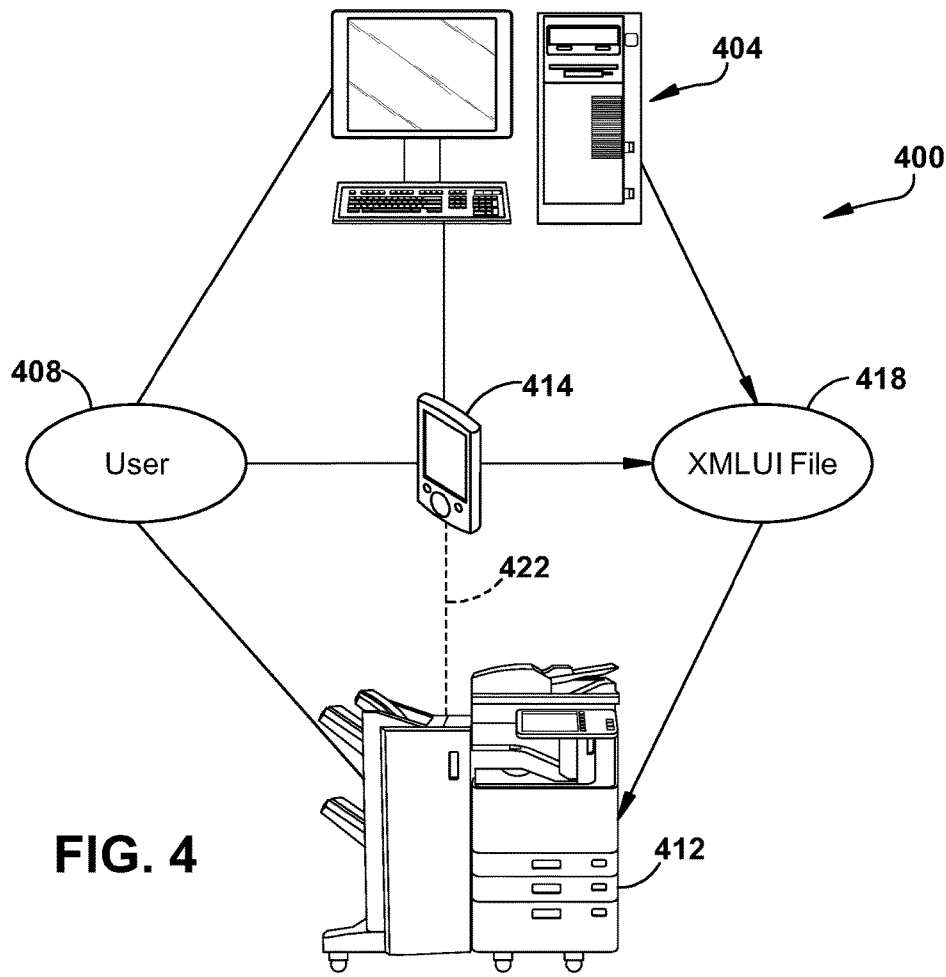
FIG. 4 is an example embodiment of a document processing system.

Turning next to FIG. 4, illustrated is an example embodiment of document processing system 400 that includes a user workstation 404 from which a user 408 commences a document processing operation with MFP 412. User 408 approaches MFP 412 with their portable data device 414 wherein proximity is determined via a NFC exchange between the two devices. XML code specifying the user's interface, such as XMLUI File 418, is relayed to MFP 412. This is suitably accomplished via a network connection to workstation 404 where configuration data is stored. Alternatively, XML configuration data is suitably communicated between the user device 414 and the MFP 412 via NFC link 422, either by causing the XML configuration data to be relayed from workstation 404 or by directly sending the XML configuration data from storage in user device 414.

Figure 5:
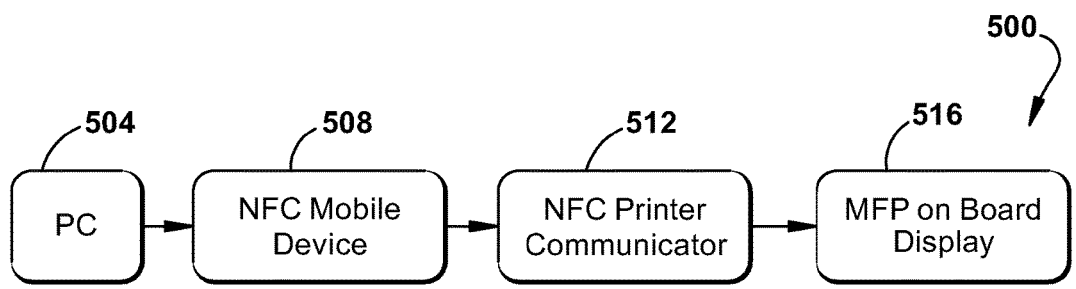
FIG. 5 is a flow diagram of an example embodiment of a document processing system.

FIG. 5 illustrates a flow diagram 500 of an example embodiment for transmitting configuration data from a workstation, such as a personal computer 504. Configuration data, such as a file encoded in XML for a user specific interface is relayed via an NFC enabled mobile device 508, and to an NFC communication interface 512 of an MFP. The configuration data is suitably verified relative to preset schema data, and if acceptable relayed to generate on-board MFP display 516.

Figure 6:
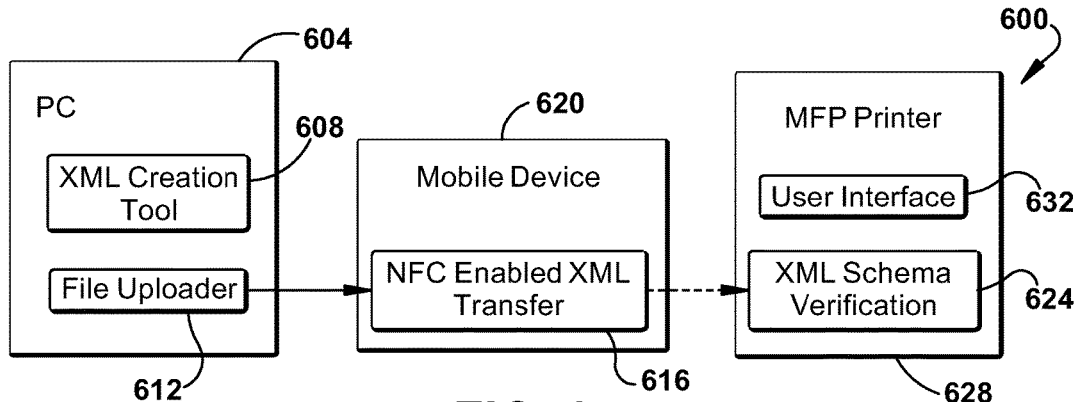
FIG. 6 is a control diagram of an example embodiment of a document processing system.

FIG. 6 illustrates a control diagram 600 of an example embodiment. A user's workstation 604 includes an XML creation tool 608 with which a user suitably customizes their MFP user interface. This is suitably accomplished for one MFP, a family of MFPs or different MFPs from different sources. Constraints in creation are suitably provided by a template which sets forth options that are available to the user for implementation, which options may be constrained by administrative policy or other overriding constraint. Translation of the configuration file is suitably accomplished to one or more of such devices with an appropriate application program interface or overlay, by way of example. File uploader 612 for workstation 604 communicates the configuration data via an NFC-enabled file transfer 616 of mobile device 620. The configuration data is received by MFP 628 and verified via XML schema verification 624. If verified, user interface 632 is customized accordingly. If not, a default user interface is suitably implemented and an appropriate message indicated to the user relative to the failure.

Figure 7:
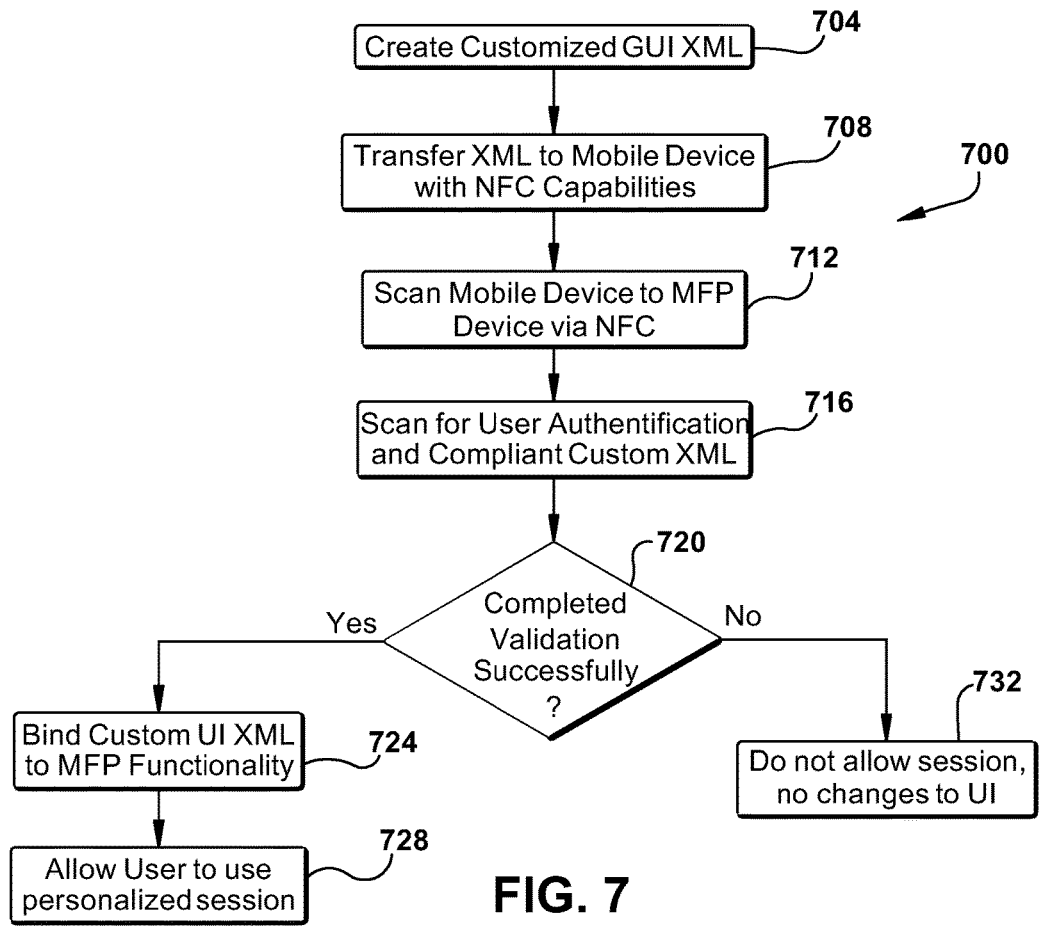
FIG. 7 is a flowchart of an example embodiment of multifunction user interface customization.

FIG. 7 is a flowchart 700 of an example embodiment of MFP user interface customization. A user creates their custom interface at block 704, and the configuration data transferred to their mobile device at block 708. The mobile device is brought proximate to a destination MFP for NFC exchange at block 712. Next, user authorization and configuration data compliance are checked at block 716. If acceptable at decision block 720, then the configuration data is bound to MFP functionality at block 724, and a personalized user interface for the user's session is enabled at block 728. If unacceptable at decision block 720, then the personalized interface is rejected at block 732. The user may be so notified, such as with a display error message. A default user interface may be provided if the user is determined to have access rights to the device through their identification information.

It will be appreciated that MFP functionality through the personalized user interface may suitably be accomplished by providing the interface directly on the user device display, such as an integrated touch screen display. By way of further example, a user may place their portable device over an MFP area and an NFC link is made. The user selections from their device's interface are suitably relayed to control the MFP. The MFP display may also be made to mirror or complement the MFP display, so as to provide for handheld control or to provide additional control options via simultaneous use of both touchscreens.

Figure 8:
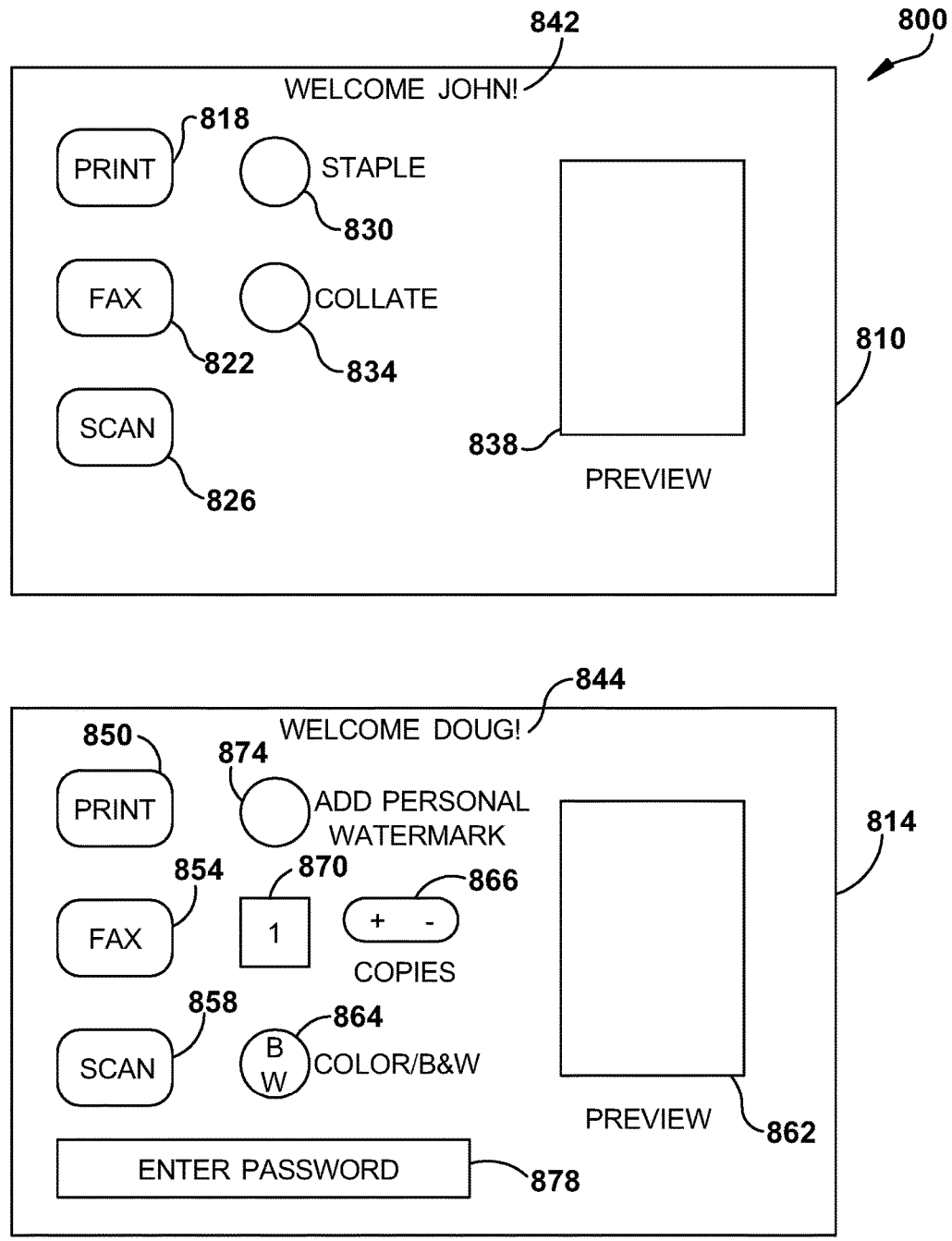
FIG. 8 illustrates example embodiments of customized user interfaces.

FIG. 8 is an example embodiment of user interfaces 800 which include a first customized active touchscreen 810 and a second customized active touchscreen 814. The example touchscreens 810, 814 are suitably created by the controller in accordance with received and verified XML configuration data. Touchscreen 810 includes selectable areas for print 818, fax 822, scan 826, staple 830 and collate 834. A preview area 838 provides a view of an associated document as it will appear after printing. It will be appreciated that functionality of touchscreen 810 is an example of basic functionality as might be desired for unsophisticated users. Also, a greeting 842 is suitably directed to the user associated with the touchscreen 810 and identified by identification data communicated by the NFC interface.

Touchscreen 814 is an example of an interface for a more sophisticated or more security conscious user. It too includes selectable areas for print 850, fax 854 scan 858 and preview 862, and also includes a selectable area for color/black-and-white 864 and more or fewer copies 866, a number of which is displayed at 870. In this example, the greeting 844 designates a different user as identified with information provided from the user device to the MFP such as via the NFC interface. However, this user's interface includes information relating to document security measures. A password entry field 878 facilitates another level of security before accessing documents. This may address risks in situations when a user's handheld device is in possession of someone other than its associated user. Also, selectable area allows for placement of the user's watermark 874 on printouts, for example, to indicate authenticity of the same.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral device comprising:
   a controller, including a processor and memory, configured for digital control of multifunction peripheral operation;
   a near field communication interface; and
   a configurable touch screen control panel,
   wherein the controller is further configured to detect a portable data device via the near field communication interface,
   wherein the controller is further configured to receive user interface configuration data from a detected portable data device via the near field communication interface,
   wherein the controller is further configured to selectively enable a plurality of user-selectable document processing operation options specified by received user interface configuration data,
   wherein the controller is further configured to generate an active display of a user interface on the touch screen control panel in accordance with the received user interface configuration data, the user interface comprising a plurality of user-selectable operation option touch areas specified by the user interface configuration data,
   wherein the controller is further configured to receive user selection data corresponding to user selection of one or more touch areas entered via the active display, and
   wherein the controller is further configured to commence a document processing operation in accordance with received user selection data.

2. The device of claim 1 wherein the controller is further configured to validate received user interface configuration data, and
   wherein the controller is further configured to selectively generate the active display in accordance with validation of received user interface configuration data.

3. The device of claim 2 wherein the controller is further configured to receive the user interface configuration data inclusive of associated user identification data, and wherein the controller is further configured to generate the active display in accordance with received user identification data.

4. The device of claim 3 wherein the user interface configuration data is comprised of extensible markup language, and wherein the controller is further configured to validate the received user interface configuration data relative to preset schema data.

5. The device of claim 4 wherein the controller is further configured to generate a display corresponding to prior document processing operation options associated with an identified user.

6. The device of claim 5 wherein the controller is further configured to bind validated user interface configuration data to data corresponding to functionality of the multifunction peripheral to provide user access to a subset of the multifunction peripheral operation options specified by user interface configuration data.

7. The device of claim 6 wherein the controller is further configured to generate a display corresponding to a multifunction peripheral operation unavailable to the user in accordance with the received user interface configuration data.

8. A method comprising:
   detecting a portable data device via a near field communication interface;
   automatically receiving user interface configuration data from a detected portable data device via the near field communication interface;
   selectively enabling a plurality of user selectable document processing operation options specified by received user interface configuration data;
   automatically generating an active display of a user interface on a touch screen control panel in accordance with the received user interface configuration data, the user interface comprising a plurality of user-selectable touch areas;
   receiving user selection data via the active display corresponding to user selection of one or more touch areas entered via the active display; and
   commencing a document processing operation in accordance with received user selection data.

9. The method of claim 8 further comprising:
   validating received user interface configuration data; and
   selectively generating the active display in accordance with validation of received user interface configuration data.

10. The method of claim 9 further comprising:
    receiving configuration data inclusive of associated user identification data; and
    generating the active display in accordance with received user identification data.

11. The method of claim 10 wherein the user interface configuration data is comprised of extensible markup language, and further comprising:
    validating received user interface configuration data relative to preset schema data.

12. The method of claim 11 further comprising generating a display corresponding to prior document processing operation options associated with an identified user.

13. The method of claim 12 further comprising binding validated user interface configuration data to data corresponding to functionality of the multifunction peripheral to provide user access to a subset of the multifunction peripheral operation options specified by the user interface configuration data.

14. The method of claim 13 further comprising generating a display corresponding to a multifunction peripheral operation unavailable to the user in accordance with the received user interface configuration data.

15. A system comprising:
    a near field communication interface;
    a memory configured to store user interface configuration data specifying generation of a user interface display for an associated multifunction peripheral; and
    a processor configured to identify a multifunction peripheral via the near field communication interface,
    wherein the processor is further configured to communicate the user interface configuration data to an identified multifunction peripheral via the near field communication interface,
    wherein the processor is further configured to automatically enable the identified multifunction peripheral for operation in conjunction with a multifunction peripheral user interface display configured by the user interface configuration data, and
    wherein the user interface configuration data is comprised of layout data configured to generate active control areas on the user interface display comprised as a touchscreen.

16. The system of claim 15 wherein the user interface configuration data is further comprised of data configured to enable a limited subset of available multifunction peripheral functions.

17. The system of claim 16 wherein the user interface configuration data further comprises user identification data configured to identify a user of the configured user interface display.

18. The system of claim 17 wherein the user interface configuration data is comprised of an extensible markup language schema.

19. The system of claim 18 wherein the processor is further configured to generate the display on a local touchscreen in accordance with the user interface configuration data.

* * * * *